(12) United States Patent
Thompson et al.

(10) Patent No.: US 7,104,340 B1
(45) Date of Patent: Sep. 12, 2006

(54) TOWED IMPLEMENT DRAFT FORCE SENSOR

(75) Inventors: Raymond Dennis Thompson, Waterloo, IA (US); Peter Alan Kosmicki, Cedar Falls, IA (US); Jeffrey David Dawson, Cedar Falls, IA (US); Scott Lisle Cook, Cedar Falls, IA (US); Edwin Roy Kreis, Waterloo, IA (US); Michael Dean Kollath, Dunkerton, IA (US); Joe Lyle Schutte, Cedar Falls, IA (US); Robert James White, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/086,619

(22) Filed: Mar. 22, 2005

(51) Int. Cl.
*A01B 59/00* (2006.01)
*G01L 1/22* (2006.01)

(52) U.S. Cl. ............... 172/677; 172/7; 73/862.628
(58) Field of Classification Search ........... 172/7–9, 172/677–680; 338/2, 196; 73/862.041, 73/862.044, 862.045, 862.08, 862.381, 862.473, 73/862.474, 862.628, 862.541, 862.57
See application file for complete search history.

(56) References Cited

U.S. PATENT DOCUMENTS

| | | | | |
|---|---|---|---|---|
| 2,520,923 A | * | 9/1950 | Franzel | 73/862.628 |
| 3,246,701 A | | 4/1966 | Schulz | 172/9 |
| 3,246,702 A | | 4/1966 | Carlin | 172/10 |
| 3,814,188 A | * | 6/1974 | Ahne | 172/7 |
| 3,825,072 A | * | 7/1974 | Collins | 172/7 |
| 3,978,597 A | | 9/1976 | Brudnak, Jr. | 37/8 |
| 3,995,696 A | * | 12/1976 | Kainer et al. | 172/7 |
| 4,031,964 A | | 6/1977 | Takahashi et al. | 172/9 |
| 4,173,259 A | | 11/1979 | Heckenkamp | 172/10 |
| 4,263,973 A | | 4/1981 | Boulais et al. | 172/4.5 |
| 4,300,638 A | | 11/1981 | Katayama et al. | 172/10 |
| 4,367,656 A | * | 1/1983 | Fritsch | 73/862.632 |
| 4,386,533 A | * | 6/1983 | Jackson et al. | 73/862.626 |
| 4,420,755 A | * | 12/1983 | Primbs, Jr. | 340/870.38 |
| 4,422,341 A | | 12/1983 | Espiritu Santo et al. | 73/862.64 |
| 4,456,074 A | * | 6/1984 | Prudenziati | 172/7 |
| 4,495,577 A | | 1/1985 | Strunk et al. | 364/424 |
| 4,640,368 A | | 2/1987 | Kittle et al. | 172/430 |
| 4,807,136 A | | 2/1989 | Rutkowski et al. | 364/424.07 |
| 5,109,707 A | * | 5/1992 | VanGerpen | 73/862.637 |
| 5,320,186 A | | 6/1994 | Strosser et al. | 172/8 |
| 5,584,347 A | * | 12/1996 | Bennett | 172/7 |
| 5,684,691 A | | 11/1997 | Orbach et al. | 364/167.01 |

(Continued)

*Primary Examiner*—Meredith C. Petravick
*Assistant Examiner*—Alexandra Pechhold

(57) ABSTRACT

A draft force sensor is provided for a coupling member coupled between a towing vehicle and a towed earth engaging implement, such as a scraper. The draft force sensor includes first and second bores extending through the coupling member. Each bore has a horizontal axis which extends perpendicular to a main fore-and-aft axis of the coupling member. The second bore is positioned above the first bore and spaced apart from the first bore. Each of the bores is surrounded by an outer cylindrical wall. Four electrical strain gauges are spaced apart and placed on the wall of each of the bores. A center line bisects an axis line which extends between the axes of the first and second bores. The axis of each bore is spaced apart from the center line by a distance which is less than a diameter of the bores. The strain gauges are connected electrically in a circuit which generates a draft force signal in response to draft forces applied to the coupling member.

12 Claims, 3 Drawing Sheets

U.S. PATENT DOCUMENTS 5,988,000 A * 11/1999 Adams .................. 73/862.044

6,125,561 A  10/2000 Shull ........................... 37/415

* cited by examiner

TOWED IMPLEMENT DRAFT FORCE SENSOR

BACKGROUND

The present invention relates to a draft force sensor for a towed or drawn implement, such as a drawn scraper.

Certain commercially available drawn scrapers are pulled by a towing vehicle, such as a tractor, and have tongue which is coupled to the towing vehicle. Scraper draft force or load is transmitted to the towing vehicle through the tongue. It is believed that scraper productivity and performance can be improved if the scraper draft force is controlled. This requires force sensors to sense the scraper draft force.

It has been attempted to sense or measure the draft load of a drawn scraper using load pins, load cells, and other methods. However, a load pin at a scraper pivot will experience wear with scraper use. The wires from a load pin would be exposed and subject to damage. Such a draft force sensor must also be sensitive to forces acting along a fore-and-aft direction and insensitive to forces acting in other directions.

U.S. Pat. No. 3,246,701 discloses a tractor hitch control system with electronic draft force sensing. Draft forces are sensed by strain gauges mounted on the walls of bores in each of the left and right hitch lower draft links. Such an arrangement of draft links and sensor bores is not suitable for the coupling of an implement such as a scraper where the implement is coupled through a single pivot/tongue coupling. Also, with single bores in each draft link, the strain gauges are sensitive to bending of the draft links, rather than only to draft forces transmitted along the main axis of the links.

SUMMARY

Accordingly, an object of this invention is to provide a draft force sensor which is not subject to wear.

A further object of the invention is to provide such a draft force sensor which is sensitive to forces acting along a fore-and-aft direction and insensitive to forces acting in other directions.

These and other objects are achieved by the present invention, wherein a draft force sensor is provided for a coupling member coupled between a towing vehicle and a towed earth engaging implement, such as a scraper. The draft force sensor includes first and second bores extending through the coupling member. Each bore has a horizontal axis which extends perpendicular to a main fore-and-aft axis of the coupling member. The second bore is positioned above the first bore and spaced apart from the first bore. Each of the bores is surrounded by an outer cylindrical wall. Four electrical strain gauges are spaced apart and placed on the wall of each of the bores. A center line bisects an axis line which extends between the axes of the first and second bores. The axis of each bore is spaced apart from the center line by a distance which is less than a diameter of the bores. The strain gauges are connected electrically in a circuit which generates a draft force signal in response to draft forces applied to the coupling member.

DETAILED DESCRIPTION

Figure 1:
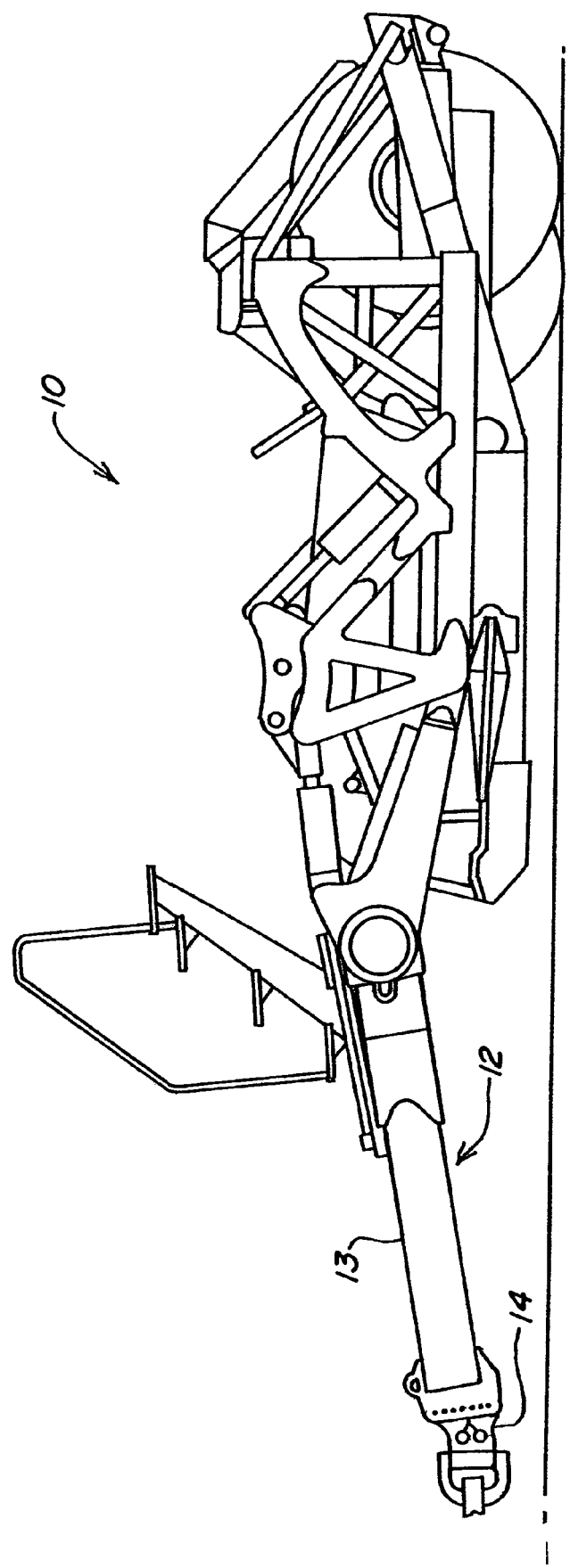
FIG. 1 is a simplified perspective view of a towed scraper having a tongue for coupling to a towing vehicle.

Referring to FIG. 1, a towed earth working implement 10, such as a scraper includes a tongue 12 with an arm 13 and a hitch pivot member 14 for connecting to a towing vehicle (not shown), such as a tractor. The tongue will transmit draft forces from the towed implement 10 to the towing vehicle generally along a fore-and-aft longitudinal axis of the tongue 12.

Figure 2:
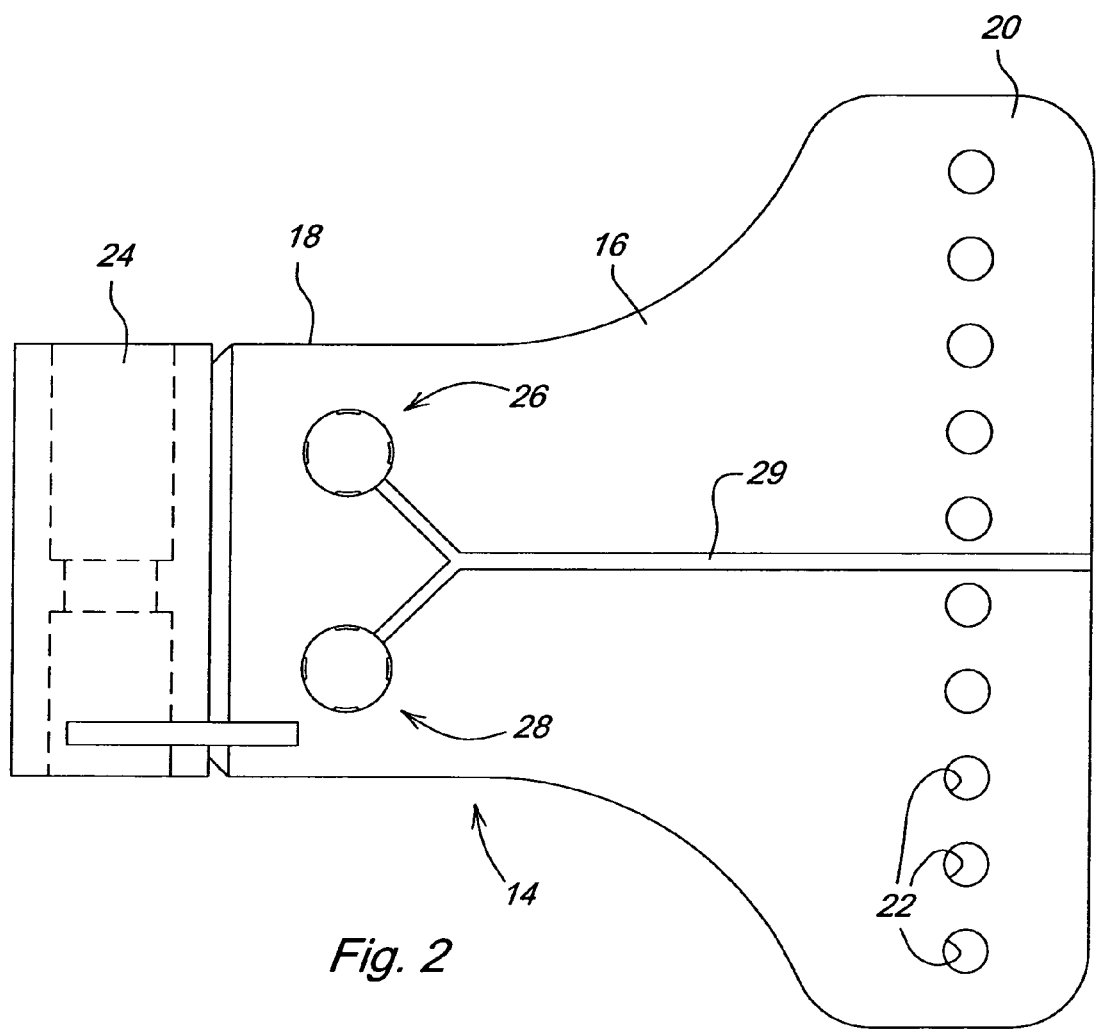
FIG. 2 is a side elevation view of a scraper tongue including the present invention.

As best seen in FIG. 2, the pivot member 14 has body 16 with a vertically smaller front end 18 and a vertically larger rear end 20. A plurality of bolt holes 22 are formed in the rear end 20 for bolting to the arm 13. A hollow cylinder 24 is fixed to front end 18 for receiving a coupling or pivot pin (not shown). A pair of identical sensor bores 26 and 28 with diameter D extend through the front end portion of the pivot member 14. Each of the first and second bores 26, 28 has an axis which extends perpendicular to a main fore-and-aft axis of the pivot member 14, and the bores are spaced apart from each other along a line which is generally perpendicular with respect to the main fore-and-aft axis. A Y-shaped groove 29 is ground into the surface of the pivot member 14 to connect the bores 26, 28 with the aft end of the pivot member 14.

Although other orientations are possible, the pivot member 14 preferably has a vertical orientation. In this case, the bores 26, 28 have horizontally extending axes, and bore 26 is positioned directly above the bore 28. The bores 26, 28 are surrounded by cylindrical walls 30, 32, respectively.

Figure 3:
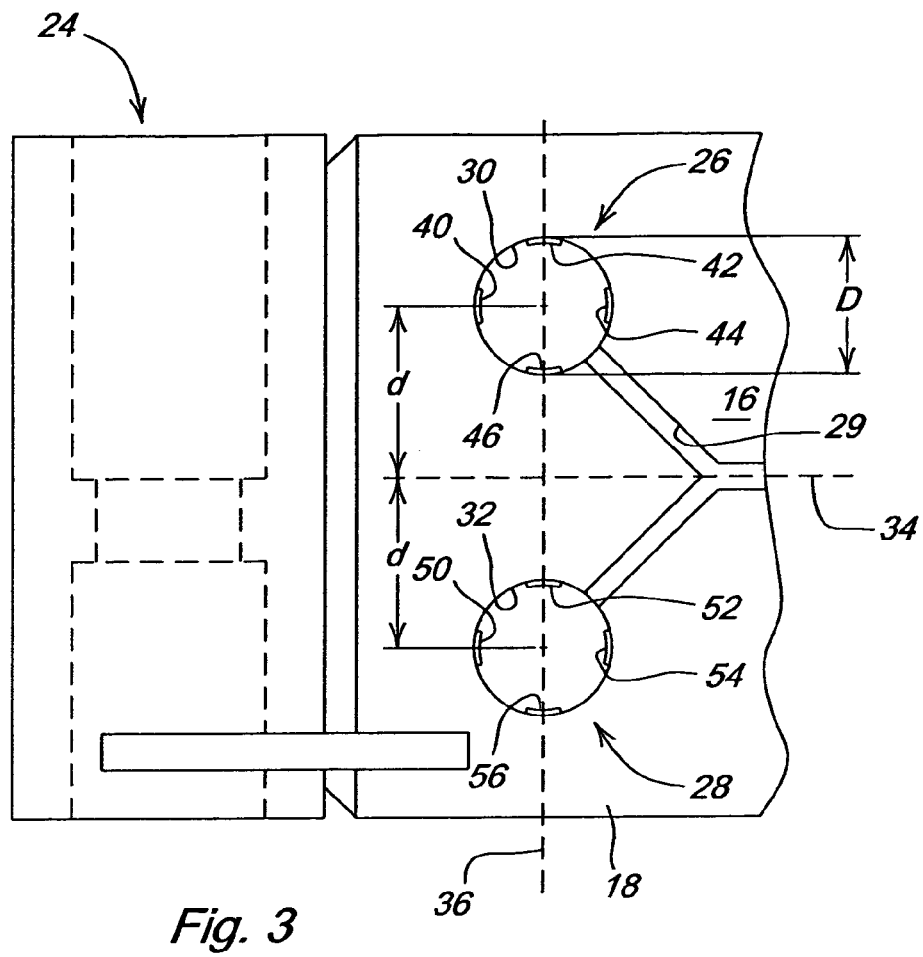
FIG. 3 is an enlarged view of a portion of FIG. 2.

As best seen in FIG. 3, a plurality, preferably four, strain gauges 40, 42, 44, 46 are mounted on wall 30 of bore 26, and four strain gauges 50, 52, 54, 56 are mounted on wall 32 of bore 28. Also, as best seen in FIG. 3, strain gauges 40, 42, 44, 46 are positioned at 9, 12, 3 and 6 o'clock orientations, respectively, on wall 30, and strain gauges 50, 52, 54, 56 are positioned at 9, 12, 3 and 6 o'clock orientations, respectively, on wall 32.

A center line 34 (which is parallel to the line through which draft forces are transmitted) bisects an axis line 36 which extends between the axes of the bores 26, 28. The axis of each bore is spaced apart from the center line by a distance d which is less than the diameter D of the bores 26, 28. For example, if the bores have a diameter D of 50 millimeters, it was found that a distance d of 40 millimeters results in optimum performance.

Figure 4:
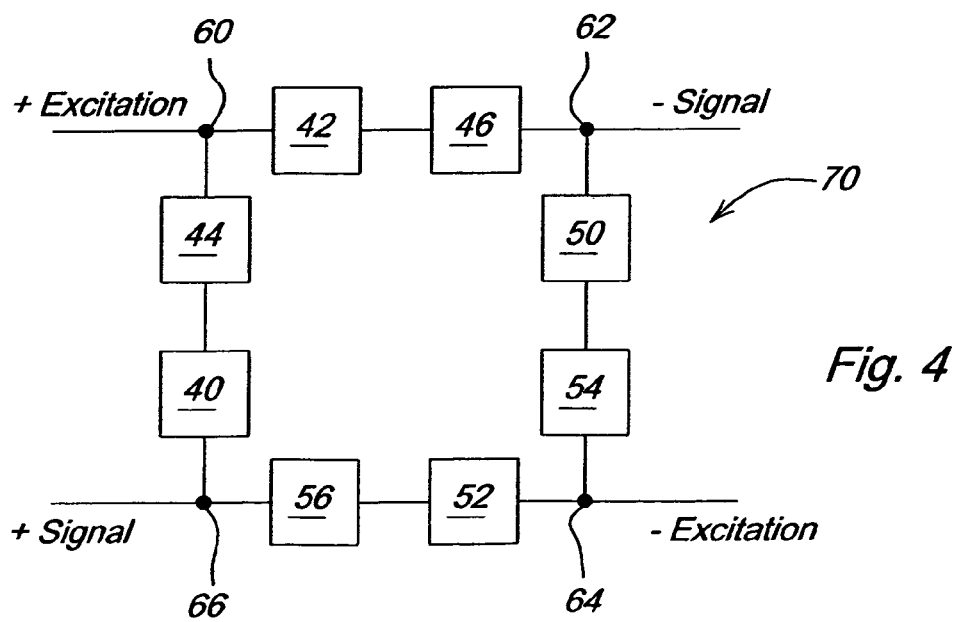
FIG. 4 is a circuit diagram showing the electrical connection of the strain gauges of FIG. 3.

Referring now to FIG. 4, the strain gauges 40–56 are connected electrically in a bridge circuit 70 between circuit nodes 60, 62, 64 and 66. More specifically, strain gauges 40 and 44 on opposite sides of the wall 30 of the first bore 26 are connected in series between adjacent nodes 66 and 60. Strain gauges 42 and 46 on the top and bottom of wall 30 are connected in series between adjacent nodes 60 and 62. Strain gauges 50 and 54 on opposite sides of the wall 32 of bore 28 are connected in series between adjacent nodes 62 and 64. Strain gauges 52 and 56 on the top and bottom of wall 32 are connected in series between adjacent nodes 64 and 66.

An excitation signal is applied to nodes 60 and 64. A sensor signal representing draft force applied to pivot member 14 is generated across nodes 62 and 66. Wires from the bridge circuit 70 are routed through and protected by the Y-shaped groove 29.

The resulting draft force sensor is sensitive to forces acting along a fore-and-aft direction and insensitive to forces acting in other directions. Using two bores doubles the signal output with respect to what could be achieved with only a single bore. The number and position of the bores and the arrangement of strain gages described above maximize the fore/aft draft force signal output while minimizing the effect of side and vertical loads during scraper operation, and also provide a strong and durable scraper tongue.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A draft force sensor for a coupling member coupled between a towing vehicle and a towed earth engaging implement, the draft force sensor comprising:
    first and second bores in the coupling member, each of the bores being surrounded by a wall, each bore having a bore axis which extends perpendicular to a main fore-and-aft axis of the coupling member, the second bore being spaced apart from the first bore along a separation line which is generally perpendicular with respect to said main fore-and-aft axis, said separation line extending through the bore axis of both bores; and
    a plurality of electrical strain gauges being spaced apart and placed on the wall of each of the bores, the strain gauges being connected electrically in a circuit, the circuit generating a draft force signal in response to draft forces applied to the coupling member.

2. The draft force sensor of claim 1, wherein:
    a center line bisects an axis line which extends between the bore axes of the first and second bores, and the bore axis of each bore being spaced apart from the center line by a distance which is less than a diameter of said bore.

3. The draft force sensor of claim 1, wherein:
    the axis line extends vertically and perpendicular to the main fore-and-aft axis of the coupling member.

4. The draft force sensor of claim 1, wherein:
    the strain gauges are connected electrically in a bridge circuit between four nodes, and strain gauges on opposite sides of the wall of each bore are connected in series between an adjacent pair of the nodes.

5. The draft force sensor of claim 1, wherein:
    the strain gauges are connected electrically in a bridge circuit between four nodes, and strain gauges on top and bottom sides of the wall of each bore are connected in series between an adjacent pair of the nodes.

6. The draft force sensor of claim 1, wherein:
    the first bore is positioned above the second bore and spaced apart from the first bore.

7. The draft force sensor of claim 5, wherein:
    each bore has a horizontal axis which extends perpendicular to the main fore-and-aft axis.

8. The draft force sensor of claim 1, wherein:
    each bore has a horizontal axis which extends perpendicular to the main fore-and-aft axis.

9. The draft force sensor of claim 1, wherein:
    each bore extends through the coupling member.

10. In a coupling member for coupling a towed earth engaging implement to a towing vehicle and for transmitting draft forces along a draft force line, a draft force sensor comprising:
    first and second bores in the coupling member, each of the bores being surrounded by an outer cylindrical wall, each bore having an axis which extends perpendicular to the draft force line, the second bore being spaced apart from the first bore along a separation line which is perpendicular with respect to the draft force line, said separation line extending through the bore axis of both bores; and
    a plurality of electrical strain gauges spaced apart and placed on the wall of each of the bores, the strain gauges being connected electrically in a bridge circuit, the bridge circuit generating a draft force signal in response to draft forces applied to the coupling member.

11. A draft force sensor for a scraper tongue coupled between a towing vehicle and a towed scraper, the draft force sensor comprising:
    first and second bores extending through a portion of the tongue, each of the bores being surrounded by an outer cylindrical wall, each bore having an axis which extends perpendicular to a main fore-and-aft axis of the tongue, the bores being spaced apart along a separation line which is perpendicular to said main fore-and-aft axis, said separation line extending through the bore axis of both bores; and
    a plurality of electrical strain gauges being spaced apart and placed on the wall of each of the bores, the strain gauges being connected electrically in a circuit, the circuit generating a draft force signal in response to draft forces applied to the tongue.

12. The draft force sensor of claim 11, wherein:
    one of the bores is positioned directly above the other bore.

* * * * *